(12) United States Patent
Domig (10) Patent No.: US 10,829,144 B2
(45) Date of Patent: Nov. 10, 2020

(54) STEERING COLUMN COMPRISING AN ADAPTIVE ENERGY ABSORPTION DEVICE FOR A MOTOR VEHICLE

(71) Applicants: THYSSENKRUPP PRESTA AG, Eschen (LI); thyssenkrupp AG, Essen (DE)

(72) Inventor: Markus Domig, Bartholomäberg (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 81 days.

(21) Appl. No.: 16/340,428

(22) PCT Filed: Oct. 18, 2017

(86) PCT No.: PCT/EP2017/076612
§ 371 (c)(1),
(2) Date: Apr. 9, 2019

(87) PCT Pub. No.: WO2018/073304
PCT Pub. Date: Apr. 26, 2018

(65) Prior Publication Data
US 2019/0232997 A1    Aug. 1, 2019

(30) Foreign Application Priority Data

Oct. 19, 2016   (DE) .................. 10 2016 220 531

(51) Int. Cl.
*B62D 1/19*     (2006.01)
*B62D 1/184*    (2006.01)
*B62D 1/185*    (2006.01)

(52) U.S. Cl.
CPC ............. *B62D 1/195* (2013.01); *B62D 1/184* (2013.01); *B62D 1/185* (2013.01); *B62D 1/192* (2013.01)

(58) Field of Classification Search
CPC ........ B62D 1/195; B62D 1/184; B62D 1/185; B62D 1/192
(Continued)

(56) References Cited

U.S. PATENT DOCUMENTS

2004/0232685 A1\* 11/2004 Gatti ................. B62D 1/195
280/777
2006/0273568 A1\* 12/2006 Manwaring ........... B62D 1/195
280/777
(Continued)

FOREIGN PATENT DOCUMENTS

DE   60 2004 012 021 T    3/2009
DE   10 2011 015 140 A    9/2012
(Continued)

OTHER PUBLICATIONS

English Translation of International Search Report issued in PCT/EP2017/076612, dated Jan. 11, 2018.

*Primary Examiner* — James A English
*Assistant Examiner* — Kurtis Nielson
(74) *Attorney, Agent, or Firm* — thyssenkrupp North America, LLC (57) ABSTRACT

A steering column with an inner casing tube rotatably mounts a steering shaft. An outer casing unit is connected to a vehicle chassis and the inner casing tube is displaceably received therein and configured to be axially fixable. An energy absorption device is operatively disposed between the casing tube and the casing unit and in which part of the energy arising in the event of a crash is absorbed when the casing tube is telescopically displaced in relation to the casing unit. The energy absorption device is configured to adapt the absorbed energy to the circumstances of the crash event.

8 Claims, 4 Drawing Sheets

(58) Field of Classification Search
USPC .......................................................... 280/777
See application file for complete search history.

(56) References Cited

U.S. PATENT DOCUMENTS

| | | | | |
|---|---|---|---|---|
| 2006/0273569 | A1* | 12/2006 | Manwaring | B62D 1/195 280/777 |
| 2007/0194563 | A1* | 8/2007 | Menjak | B62D 1/195 280/777 |
| 2008/0229867 | A1* | 9/2008 | Waibel | B62D 1/195 74/493 |
| 2011/0115206 | A1* | 5/2011 | Sulser | B62D 1/195 280/775 |
| 2012/0266716 | A1* | 10/2012 | Sulser | B62D 1/184 74/493 |
| 2013/0068062 | A1* | 3/2013 | Kircher | F16F 7/125 74/492 |
| 2014/0230596 | A1* | 8/2014 | Kwon | B62D 1/184 74/493 |
| 2015/0251684 | A1* | 9/2015 | Chiba | B62D 1/195 74/493 |
| 2016/0046318 | A1* | 2/2016 | Stinebring | B62D 1/195 74/493 |
| 2016/0121920 | A1* | 5/2016 | Klepp | B62D 1/195 74/492 |
| 2016/0244015 | A1* | 8/2016 | Dubay | B60R 21/02 |
| 2018/0050719 | A1* | 2/2018 | Agbor | B62D 1/184 |
| 2018/0208233 | A1* | 7/2018 | Kwon | B62D 1/185 |
| 2020/0189648 | A1* | 6/2020 | Domig | B62D 1/20 |

FOREIGN PATENT DOCUMENTS

| | | | | |
|---|---|---|---|---|
| DE | 102012109079 A1 * | 3/2014 | ............ | B62D 1/195 |
| DE | 102014101631 B3 * | 6/2015 | ............ | B62D 1/189 |
| DE | 10 2016 214 709 A | 2/2018 | | |
| DE | 102018204735 A1 * | 10/2018 | ............ | B62D 1/195 |
| EP | 2 900 540 B | 1/2017 | | |
| GB | 2 059 006 A | 4/1981 | | |
| WO | 2016/142482 A | 9/2016 | | |

* cited by examiner

STEERING COLUMN COMPRISING AN ADAPTIVE ENERGY ABSORPTION DEVICE FOR A MOTOR VEHICLE

CROSS REFERENCE TO RELATED APPLICATIONS

This application is a U.S. National Stage Entry of International Patent Application Serial Number PCT/EP2017/076612, filed Oct. 18, 2017, which claims priority to German Patent Application No. DE 10 2016 220 531.5, filed Oct. 19, 2016, the entire contents of both of which are incorporated herein by reference.

FIELD

The present disclosure generally relates to a steering column for a motor vehicle.

BACKGROUND

A steering column in which a strip-shaped deformation element is pulled though a brake having a constricted portion and on account thereof is deformed is known from DE 10 2011 015 140 A1. Part of the energy arising in the event of a crash is absorbed herein and used for the deformation of the deformation element. It is a disadvantage of this solution that an adaptation of the amount of energy to be absorbed to the varying conditions of the respective crash event such as, for example, the vehicle speed, the mass of the vehicle driver, or whether or not the vehicle driver is belted up, is not possible.

Thus a need exists for a steering column having an energy absorption device such that the quantity of energy to be absorbed in the crash event can be adapted to the prevailing circumstances. Furthermore, the adaptive energy absorption device is to have only a minor requirement in terms of installation space.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, having an inner casing tube which rotatably mounts a steering shaft, and an outer casing unit which is capable of being connected to the vehicle chassis and in which the inner casing tube is received so as to be displaceable and fixed in the axial direction; having an energy absorption device which is operatively disposed between the casing tube and the casing unit and in which part of the energy arising in the event of a crash is capable of being absorbed when the casing tube is telescopically displaced in relation to the casing unit.

The solution according to the invention provides that the energy absorption device comprises at least two deformation strips which are fastened to the casing tube and on which in each case one deformation slide which is connected to the casing unit and which encompasses and jams the external narrow sides of the respective deformation strip is disposed, in that said deformation slide deforms the respective deformation strip when the deformation strip in the crash event is displaced in the axial direction relative to the deformation slide, and in that a connection between a first deformation slide and the casing unit, or between the first deformation element and a second deformation element, is capable of being coupled or decoupled by means of a switching device.

On account of the measure according to the invention that a deformation slide is capable of being coupled or decoupled by means of a switching device, in the crash event, in the case of a coupled switching device both deformation strips can be deformed, or in the case of a decoupled switching device only the second deformation strip can be deformed. More energy is absorbed in the deformation of both deformation strips than in the case of only the second deformation strip being deformed. On account thereof, the energy absorbed in the crash event can be adapted to the circumstances of the crash, for example to the weight of the driver impacting the steering wheel, or to the circumstance of whether the driver is or is not belted up.

In one preferred embodiment the switching device is a pyrotechnical switch. Said pyrotechnical switch may or may not be triggered in the crash event. Pyrotechnical switches require only a small installation space and switch very rapidly. Alternatively, it is likewise conceivable and possible that a solenoid is used as the switching device.

One advantageous design embodiment of the invention furthermore provides that the deformation slides are connected to the outer casing unit by way of a rack plate, wherein an arrestor element provided with teeth is connected to the outer casing unit by way of a tightening device which pushes the arrestor element against the rack plate so as to in the travelling operation fix the latter in an immovable manner on the casing unit such that a displacement of the casing tube in relation to the casing unit in the crash event is possible only by activating the energy absorption device. This assembly requires particularly little installation space.

The arrestor element being pushed against the rack plate is to be understood that the arrestor element and the rack plate are mutually engaged. To this end, it is not necessary for a force to pre-tension the arrestor element in the direction of the rack plate.

The tightening device can preferably comprise a first lifting disk and a second lifting disk, wherein the first lifting disk is connected in a rotationally fixed manner to an activation lever and a tensioning bolt and interacts with the second lifting disk, wherein in a rotation of the first lifting disk in relation to the second lifting disk by means of the activation lever a clamping stroke is provided in the direction of the tensioning axis. The second lifting disk is coupled to the arrestor part. The first lifting disk preferably comprises a cam portion. The second lifting disk preferably comprises a cam track contour which can interact with the cam portion.

The tightening device by means of an activation lever is either tightened or released, also referred to as the fixing position and the releasing position. In the released state (releasing position) of the tightening device, the casing tube can be telescoped in relation to the casing unit, on the one hand. In the tensioned state (fixing position), the casing tube is blocked in relation to the casing unit such that a displacement of the casing tube in relation to the casing unit is possible only when a force which exceeds a predetermined breakaway force is introduced into the steering shaft. In other words, in the crash event the casing tube can telescope into the casing unit while energy is absorbed by the energy absorption device. The tightening device in the normal operation is in the fixing position in which the adaptation of the steering shaft position, that is to say the adjustment of the casing tube in relation to the casing unit, is prevented.

In one embodiment, as an alternative to a manual adjustment, it is possible that the casing tube and the casing unit are capable of being mutually telescoped by means of a motorized drive. The fixing capability of the casing tube in the relation to the casing unit is implemented by the standstill of the motorized drive, and in one advantageous embodiment is implemented by a self-locking gear mechanism. The invention in terms of the required installation space is further improved when the deformation strips are disposed on top of one another, wherein a second deformation strip that lies closer to the casing tube is preferably configured so as to be wider than the first deformation strip that is disposed on the second deformation strip, wherein the second deformation slide that is disposed on the second deformation strip is preferably wider than the first deformation slide that is disposed on the first deformation strip, such that said second deformation slide encompasses both deformation strips but jams only the second deformation strip, and wherein the first deformation slide encompasses and jams only the first deformation strip.

In the case of this construction mode, both deformation strips are disposed on the same side of the casing tube and said two deformation strips require slightly more installation space than an energy absorption device having a single deformation strip. Nevertheless, when the switching device is coupled, the first deformation slide deforms only the first deformation strip, and the second deformation slide deforms only the second deformation strip. The two deformation slides can preferably be disposed behind one another in the axial direction. In the crash event, either both deformation slides are pulled over both deformation strips, or only the second deformation slide is pulled over the second deformation strip when the switching device has previously been decoupled. The first deformation strip remains in a non-deformed state.

The deformation strips are advantageously held at a mutual spacing by spacers and in the radial direction are fixed between the casing tube and the rack plate. This prevents any bending of the deformation strips and any slipping of the latter from the respective deformation slides, and guarantees uninterrupted functioning when one or both of the deformation strips is/are deformed.

The spacers are advantageously disposed on the second deformation strip. Said spacers can thus be assembled conjointly with the second deformation strips in one single operative step. In an advantageous design embodiment the spacers are disposed both on the upper side of the second deformation strip that faces the first deformation strip as well as on the lower side of the second deformation strip that faces the casing tube. The second deformation tube herein is not only held and guided at a spacing in relation to the first deformation strip but also in relation to the casing tube. In one advantageous embodiment that is simple to produce, the spacers are designed as studs or a web, and are molded in the second deformation strip.

In one advantageous refinement the deformation strip and the spacers are a single-piece integral component.

Figure 1:
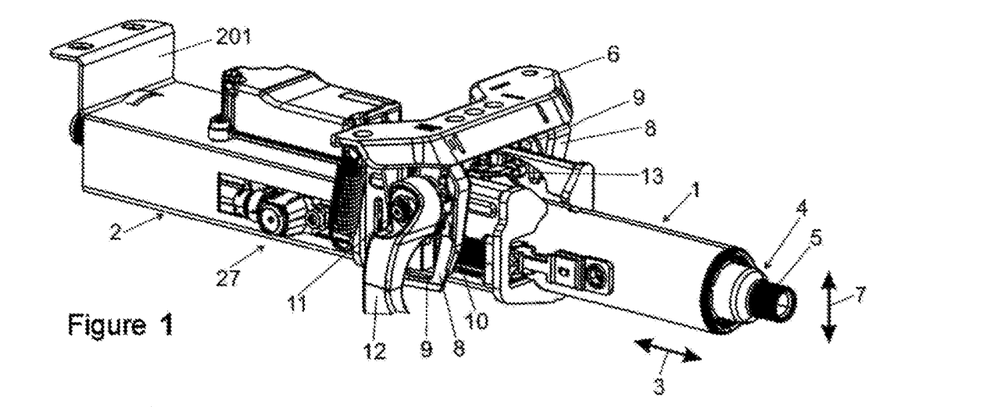
FIG. 1 is a perspective view of a steering column having a variably switchable energy absorption device.

A steering column according to the invention, in which an inner casing tube 1 is mounted in an outer casing unit 2 so as to be longitudinally displaceable in the axial direction 3 is shown in FIG. 1. A steering shaft 4 is rotatably mounted in the casing tube 1, a steering wheel (not shown) being able to be assembled on the end 5 of said steering shaft 4 that faces the driver of the motor vehicle. The casing unit 2 is capable of being connected to the vehicle chassis (not shown) by way of a holder 6. The holder 6 is capable of being fixed to the vehicle chassis by means of fastening means, while the casing unit 2 is mounted so as to be pivotable in the vertical direction 7 in relation to the holder 6.

The holder 6 for the pivotable mounting is provided with two clamping jaws 8 which encompass the casing unit 2 and which have vertical slots 9 configured as elongate bores. The casing unit 2 comprises a fastening portion 201 which is capable of being connected to the vehicle chassis and is elastically deformed by an adjustment in the vertical direction 7. A tightening device 10 is provided with a tensioning bolt 11 which passes through the vertical slots 9 of the clamping jaws 8 and through two bores 13 of the casing unit 2. The tightening device 10 comprises a first lifting disk 101, configured as a cam disk, and a second lifting disk 102, configured as a cam track disk, wherein the second lifting disk has a cam track 103. The first lifting disk 101 is connected in a rotationally fixed manner to an activation lever 12 and the tensioning bolt 11. The tightening device 10, by means of the activation lever 12, is either tightened or released in that the first lifting disk 101 in relation to the second lifting disk 102 is rotated about the axis of the tensioning bolt 11. In the released state (releasing position) of the tightening device 10, the casing tube 1 can be displaced in the axial direction 3 in relation to the casing unit 2, on the one hand, and the casing unit 2 can be pivoted in the vertical direction 7 in relation to the holder 6, on the other hand. On account thereof, a longitudinal adjustment of the steering wheel in the axial direction 3 and a height adjustment of the steering wheel in the vertical direction 7 are enabled. In the tightened state (fixing position) of the tightening device 10, the casing tube 1 is tightly clamped in the casing unit 2 and the casing unit 2 is also tightly clamped in the holder 6 such that the steering column is fixed and a height adjustment or longitudinal adjustment of the steering wheel is no longer possible.

Figure 2:
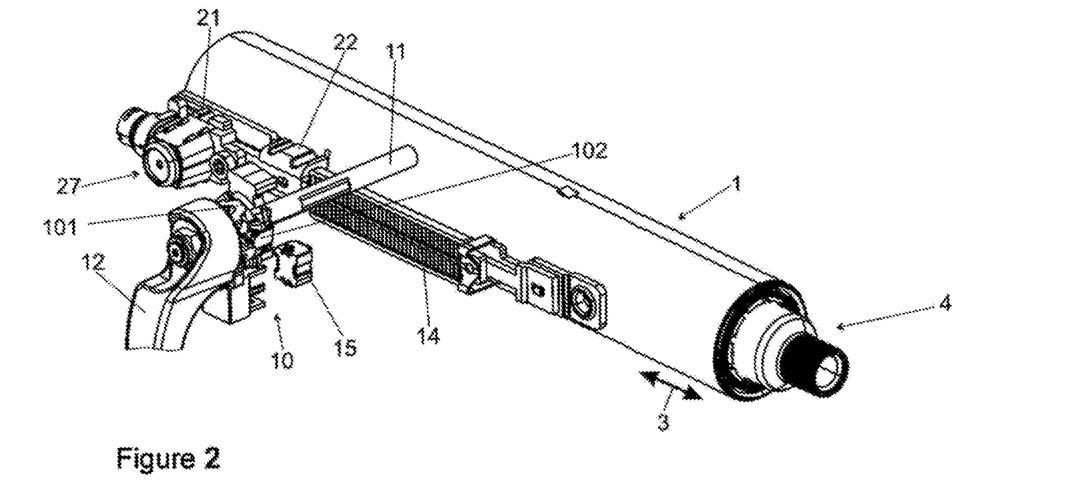
FIG. 2 is a perspective view of the inner casing tube having an energy absorption device and a tightening device.
Figure 3:
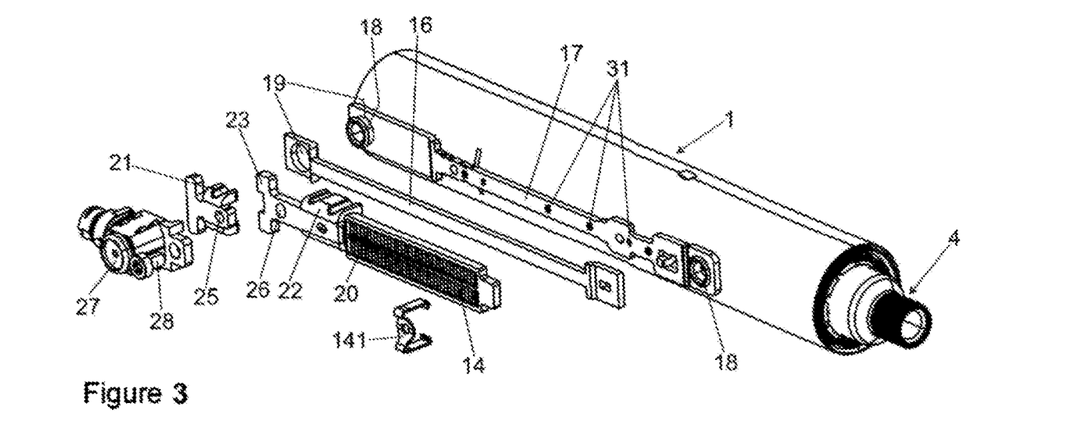
FIG. 3 is an exploded view of the energy absorption device on the casing tube.
Figure 4:
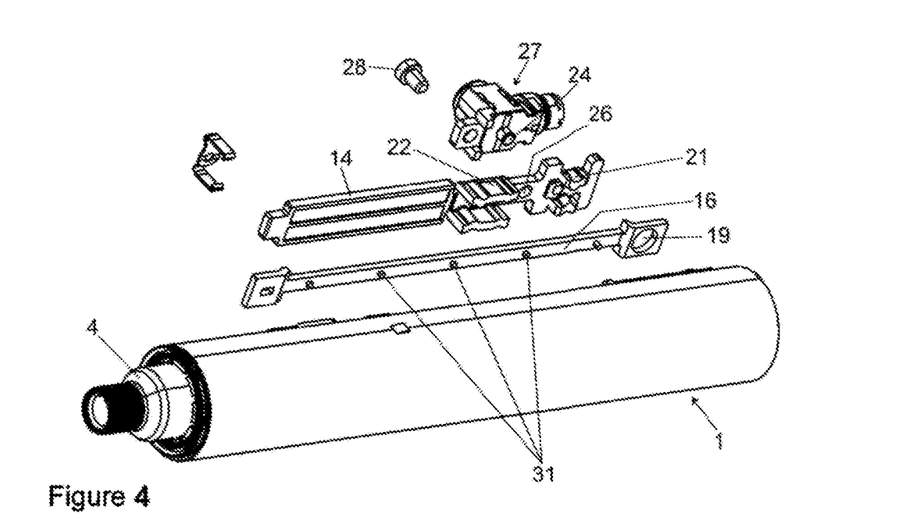
FIG. 4 is an exploded view similar to that of FIG. 3, but viewed from another angle.
Figure 5:
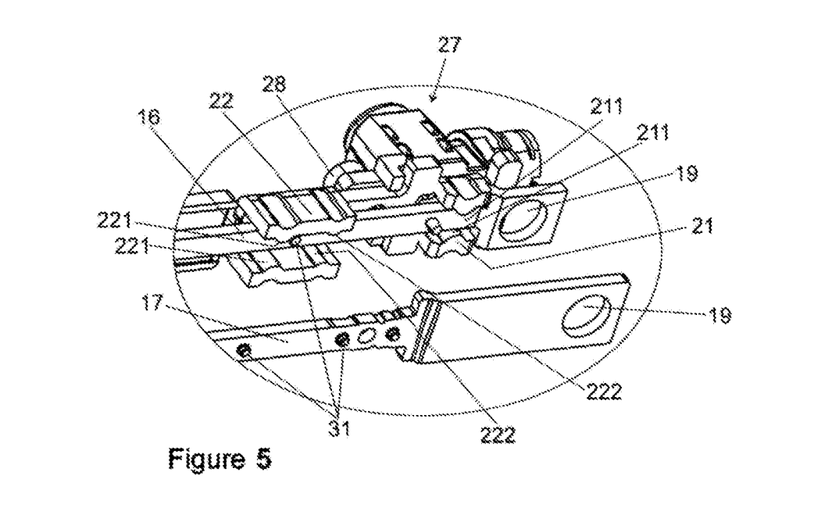
FIG. 5 is a perspective partial view of a partially disassembled energy absorption device.
Figure 6:
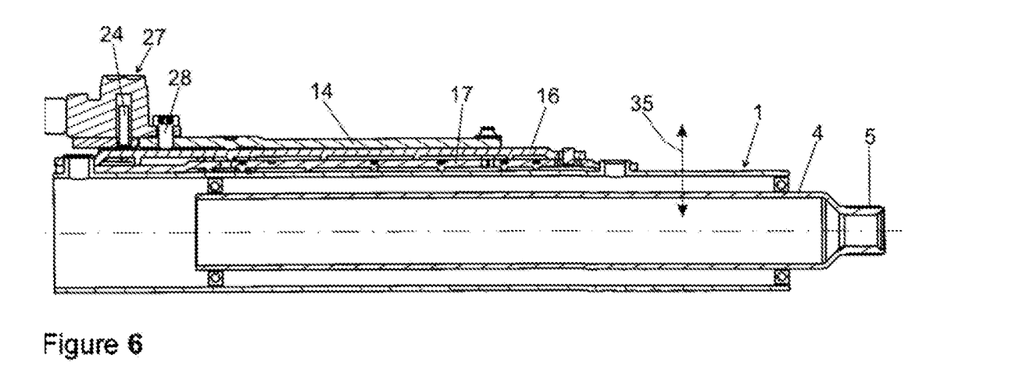
FIG. 6 is a sectional view of a casing tube having an energy absorption device assembled thereon.
Figure 7:
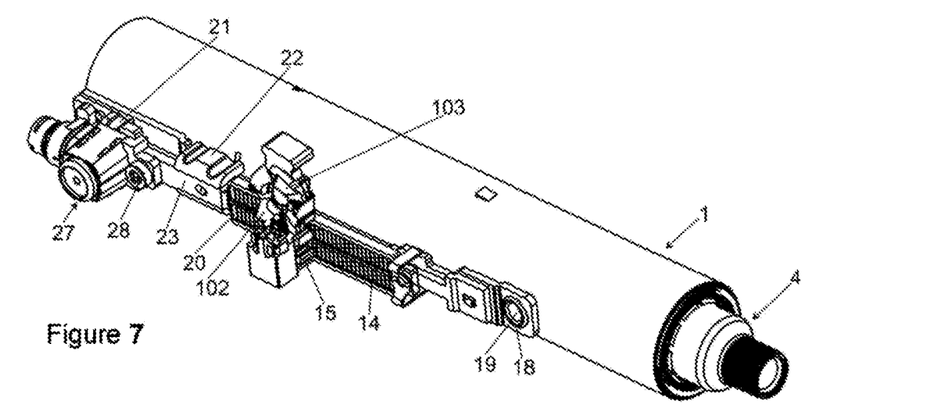
FIG. 7 is a perspective view of a casing tube having an energy absorption device, prior to the crash.
Figure 8:
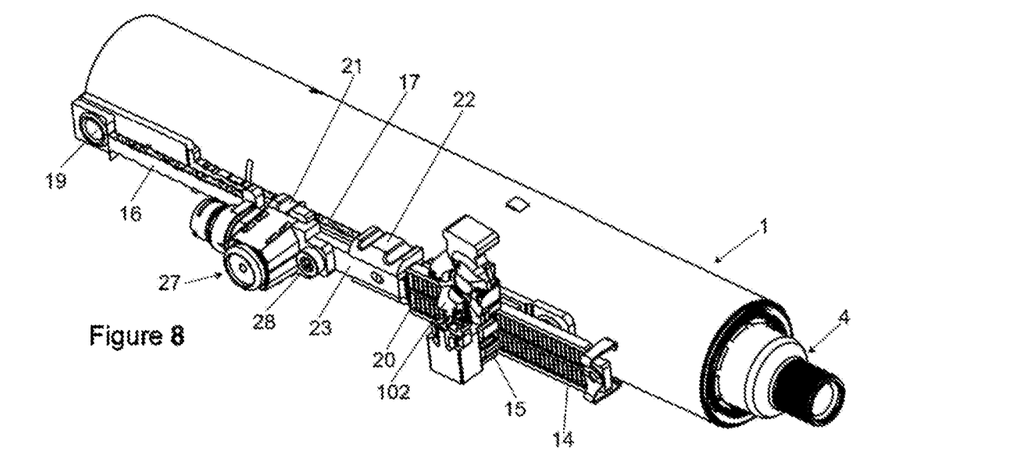
FIG. 8 is a perspective view, similar to that of FIG. 7, of an energy absorption device, after a crash in which two deformation strips have been deformed.

As can best be seen in FIG. 2, the casing tube 1 is provided with a rack plate 14 that is aligned in the axial direction 3. An arrestor element 15 which is capable of being pushed against the rack plate 14 by the tightening device 10 and which is operatively connected to the second lifting disk 102 is likewise provided with teeth. When the arrestor element 15 in the tightened state of the tightening device 10 is pressed against the rack plate 14, the teeth of the arrestor element 15 mesh with the teeth of the rack plate 14 such that the rack plate 14 is fixed so as to be immovable in relation to the holder 6. A displacement of the rack plate 14 in relation to the holder 6 in the axial direction 3 is no longer possible in this instance.

In order for the casing tube 1 in the normal operation of the vehicle to be displaced in the axial direction 3 in relation to the casing unit 2, the tightening device 10 has to be released by way of the activation lever 12, that is to say transferred from the fixing position to the releasing position, wherein the arrestor element 15 is raised from the rack plate 14 and a displacement of the rack plate 14 in the axial direction 3 in relation to the arrestor element 15 is possible. The arrestor element 15 per se cannot be displaced in the axial direction in relation to the holder 6 and the casing unit 2, since the tensioning bolt 11 is prevented from such a displacement by the vertical slots 9.

However, the tensioning bolt 11 can be displaced in the vertical direction 7 in the vertical slots 9. On account thereof, the casing unit 2, conjointly with the casing tube 1 disposed therein, is pivoted in the vertical direction 7. The tightening device 10, conjointly with the tensioning bolt 11, the activation lever 12, and the arrestor element 15 is also pivoted collectively with the casing tube 1 and the casing unit 2 in the vertical direction 7 such that arrestor element 15 at all times remains in the region of the rack plate 14.

As can best be seen in FIGS. 3 to 6, two deformation strips 16, 17 which are aligned in the axial direction 3 are disposed on the casing tube 1, wherein a first deformation strip 16 is disposed on top of the second deformation strip 17. The second deformation strip 17 is disposed directly on the surface of the casing tube 1. For fastening to the casing tube 1, the latter is provided with fastening elements 18 which protrude beyond the surface of the casing tube 1 and through corresponding openings 19 at the ends of the deformation strips 16, 17.

The rack plate 14, at the end 20 thereof that lies in the travel direction of the vehicle, is connected to two deformation slides 21, 22, wherein a first deformation slide 21 is capable of being decoupled. A coupling rail 23 connects the end 20 of the rack plate 14 to the two deformation slides 21, 22, wherein the connection of the rack plate 14 to the second deformation slide 22 is fixed and inseparable, and the connection to the first deformation slide 21 is designed so as to be capable of being decoupled. The rack plate 14 and the second deformation slide 22 are configured as a single-part integral component. The rack plate 14 and the second deformation slide 22 can be configured as a formed component or else as a sintered component. A clamping spring 141 serves as a downholding element and, on the side facing away from the first deformation slide 22, fastens the rack plate 14 to the second deformation strip 17 such that any radial raising of the rack plate 14 in the crash event is prevented. The coupling of the first deformation slide 21 to the coupling rail 23 is performed by means of a coupling bolt 24 (see FIG. 6) which is capable of being introduced into a bore 25 of the first deformation slide 21. A pyrotechnical switch 27 is fastened by means of a fastening bolt 28 in a bore 26 of the coupling rail 23. The coupling bolt 24 in the normal case protrudes through the bore 25 of the first deformation slide 21. The coupling bolt 24 can be pulled out of the bore 25 of the first deformation slide 21 by activating the pyrotechnical switch 27, such that the first deformation slide 21 is decoupled from the coupling rail 23. For example, when the driver in the crash event impacts the steering wheel, very high forces in the travel direction, which in the case of a closed tightening device 10 can cause a displacement of the casing tube 1 in the axial direction 3 in relation to the casing unit 2, act on the steering wheel and thus on the steering shaft 4 and the casing tube 1. Since the rack plate 14 by way of the arrestor element 15, by means of the tightening device 10, is connected in an immovable manner to the casing unit 2, said rack plate 14 cannot move in the axial direction 3. The same applies to the second deformation slide 22 which is non-releasably connected to the rack plate 14, and also applies to the first deformation slide 21 when the latter by way of the pyrotechnical switch 27 and the coupling bolt 24 is connected to the coupling rail 23. When the casing tube 1 in the crash event is forcibly displaced by a high force in the axial direction 3 in relation to the casing unit 2, said casing tube 1 entrains the two deformation strips 16, 17 which are fixedly connected to the casing tube 1. On the other hand, since the two deformation slides 21, 22 cannot be displaced in relation to the casing unit 2, said two deformation slides 21, 22 are pulled over the associated deformation strips 16, 17 and herein deform the latter. The deformation energy that has to be generated for the deformation of the deformation strips 16, 17 is thus absorbed from the kinetic energy. The casing tube 1, and the impacting driver by way of the steering shaft 4 and the steering wheel, herein are decelerated to the extent that kinetic energy is absorbed in both deformation strips 16, 17.

Figure 9:
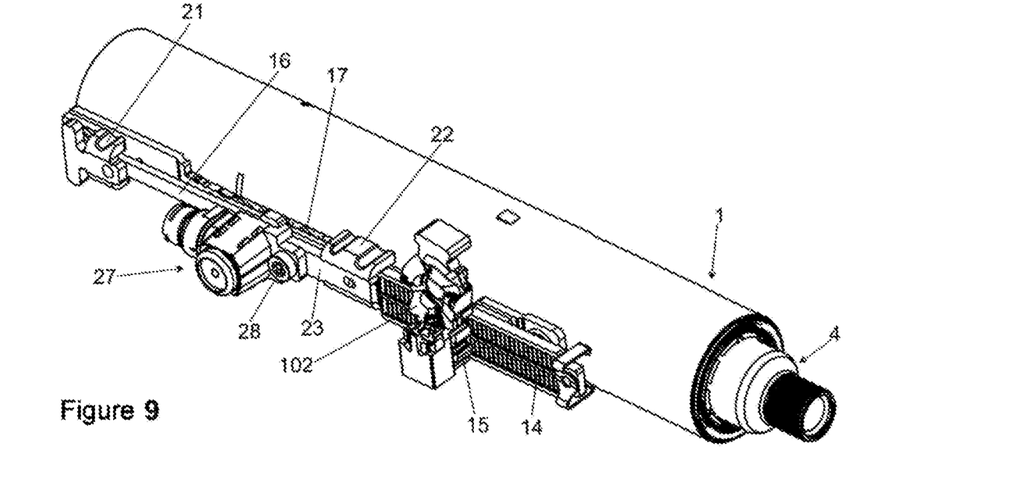
FIG. 9 is a perspective view, similar to that of FIG. 8, of an energy absorption device, after a crash in which only the second deformation strip has been deformed.

When other circumstances, for example because the driver is secured by the safety belt, that is to say is belted up, arise in the crash event, the impact of the driver on the steering wheel will thus be less hard, and less energy will have to be absorbed by the energy absorption device. In this case, the pyrotechnical switch 27 which pulls the coupling bolt 24 out of the bore 25 of the first deformation slide 21 is activated. When the casing tube 1 in this case is again displaced by the forces arising in the crash event in the axial direction 3 in relation to the casing unit 2, the decoupled first deformation slide 21 is not moved in relation to the first deformation strip 16 but remains at the position assumed by said deformation slide 21 prior to the crash. Only the second deformation slide 22 which is non-releasably connected to the coupling rail 23 and the rack plate 14 is pulled over the second deformation strip 17. This situation is illustrated in FIG. 9.

In this case, only the second deformation strip 17 is thus deformed; the first deformation strip 16 remains non-deformed. Less deformation energy is required for the deformation of a single deformation strip 17 than in the other case in which two deformation strips 16, 17 have to be deformed. Therefore, the deformation of a single deformation strip 17 also absorbs less kinetic energy than the deformation of two deformation strips 16, 17. The activation of the pyrotechnical switch 27 prior to the displacement of the casing tube 1 in relation to the casing unit 2 consequently leads to less kinetic energy being absorbed by the energy absorption device according to the invention in the displacement in the axial direction 3 than in the case without the activation of the pyrotechnical switch 27. The kinetic energy absorbed in the crash event can therefore be adapted to the respective prevailing circumstances of the crash event.

The adaptive energy absorption device according to the invention requires only very little installation space because the deformation strips 16, 17 and the rack plate 14 are disposed directly on top of one another on the same side of the surface of the casing tube 1. In order for the first deformation slide 21 to deform only the first deformation strip 16, and for the second deformation slide 22 to deform only the second deformation strip 17, the second deformation strip that lies closer to the casing tube 1 transverse to the axial direction 3 is designed so as to be wider than the first deformation strip 16. The first deformation slide 21 by way of the short flanks thereof comprises only the first deformation strip 16. The short flanks of the first deformation slide 21 herein jam the narrow sides of the first deformation strip 16 such that said narrow sides deform the first deformation strip 16 as soon as the first deformation slide 21 is pulled in the axial direction 3 over the first deformation strip 16. The first deformation slide 21 comprises bolt-type protrusions 211 which interact with the narrow sides of the deformation strip 16 and deform the latter in the case of a relative movement. The protrusions 211 are mutually spaced apart, wherein the spacing between the protrusions 211 is less than the width of the deformation strip 16, that is to say the width of the narrow sides of the deformation strip 17. The bolt-type protrusions 211 comprise a radiused surface.

The second deformation slide 22, transversely to the axial direction 3, is designed so as to be wider, and the longer flanks thereof reach the wider second deformation strip 17 lying below the first deformation strip 16 such that the second deformation slide 22 by way of the longer flanks thereof jams the narrow sides of the second deformation strip 17 so firmly that said second deformation slide 22 deforms the second deformation strip 17 as soon as the second deformation slide 22 is pulled over the second deformation strip 17.

The second deformation slide 22 herein also comprises the first deformation strip 16. However, since the second deformation slide 22 is wider than the first deformation slide 21, the flanks of the second deformation slide 22 do not embrace the narrow sides of the first deformation strip 16. The first deformation strip 16 is therefore not deformed when the second deformation slide 22 is pulled in the axial direction 3 over the former.

The second deformation slide 22 comprises a first pair of bolt-type protrusions 221 and a second pair of bolt-type protrusions 222, said bolt-type protrusions 221, 222 interacting with the narrow sides of the deformation strip 17 and deforming the latter. The protrusions 221, and the protrusions 222, respectively, are mutually spaced apart, wherein the spacing between the protrusions 221, and the protrusions 222, respectively, is less than the width of the deformation strip 17, that is to say the width of the narrow sides of the deformation strip 17. The bolt-type protrusions 221 and the bolt-type protrusions 222 comprise a radiused surface. It can be provided that the mutual spacing of the second protrusions 222 is less than, equal to, or larger than the mutual spacing of the first protrusions 221. The crash properties can be set in terms of construction on account thereof.

Figure 10:
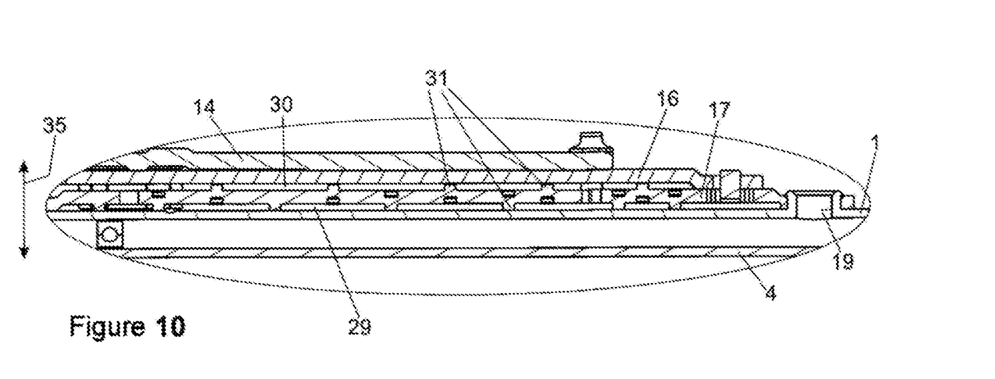
FIG. 10 is a longitudinal sectional view of a detail of an energy absorption device assembled on a casing tube, in an alternative embodiment having spacers between the first and the second deformation strip.

As can be seen in FIG. 10, it is possible that the second deformation strip 17 in an alternative embodiment is in each case provided with studs 31 on the lower side 29 of said deformation strip 17 that faces the casing tube 1 as well as on the upper side 30 of said deformation strip 17 that faces the first deformation strip 16, said studs 31 serving as spacers. On account of this measure it is possible for the two deformation strips 16, 17 to be disposed directly on top of one another on the casing tube 1. This enables a particularly compact construction mode. It is ensured by the studs 31 that the deformation strips are not bent in such a manner that said deformation strips slip out of the respective deformation slides. Moreover, space for the deformations of the narrow sides of the deformation strips 16, 17 is thus made available such that mutual impediments of the functions of said deformation strips 16, 17 are avoided.

The invention permits a particularly compact construction mode which is associated with lower production costs and nevertheless guarantees a reliable functioning of the energy absorption device in both switching states.

LIST OF REFERENCE SIGNS

1 Casing tube
2 Casing unit
3 Axial direction
4 Steering column
5 End
6 Holder
7 Vertical direction
8 Clamping jaws
9 Vertical slots
10 Tightening device
11 Tensioning bolt
12 Activation lever
13 Bore
14 Rack plate
15 Arrestor element
16 First deformation strip
17 Second deformation strip
18 Fastening element
19 Opening
20 End
21 First deformation slide
22 Second deformation slide
23 Coupling rail
24 Coupling bolt
25 Bore
26 Bore
27 Switch
28 Fastening bolt
29 Lower side
30 Upper side
31 Studs/spacers
32
33
34
35 Radial direction
35

What is claimed is:
1. A steering column for a motor vehicle, comprising:
a steering shaft;
an inner casing tube that rotatably mounts the steering shaft;
an outer casing unit configured to connect to a vehicle chassis and configured to displaceably receive the casing tube and fix the casing tube in an axial direction; and
an energy absorption device which is operatively disposed between the casing tube and the casing unit and in which part of the energy generated in a crash is absorbed when the casing tube is telescopically displaced in relation to the casing unit, wherein the energy absorption device comprises:
- a first deformation strip and a second deformation strip fastened to the casing tube, and
- a first deformation slide and a second deformation slide disposed respectively on the first and second deformation strips, the first and second deformation slides connected to the casing unit and respectively configured to encompass and jam external narrow sides of the first and second deformation strips, and
- wherein the first and second deformation slides deform respective first and second deformation strips when the first and second deformation strips are displaced in the axial direction relative to the first and second deformation slides, and
- a switching device configured to connect the first deformation slide and the casing unit or couple or decouple the first deformation strip and the second deformation strip.

2. The steering column of claim 1, wherein the switching device is a pyrotechnical switch.

3. The steering column of claim 1, wherein the first and second deformation slides are connected to the casing unit by way of a rack plate, and further comprising:
- an arrestor element provided with teeth connected to the casing unit by way of a tightening device which is configured to push the arrestor element against the rack plate to fix the rack plate in an immovable manner on the casing unit in the traveling operation such that a displacement of the casing tube in relation to the casing unit in the crash event is enabled only by activating the energy absorption device.

4. The steering column of claim 3, wherein the first and second deformation strips are disposed on top of one another,
- wherein the second deformation strip lies closer to the casing tube and is wider than the first deformation strip, which is disposed on the second deformation strip,
- wherein the second deformation slide is disposed on the second deformation strip and is wider than the first deformation slide, which is disposed on the first deformation strip, such that said second deformation slide encompasses both first and second deformation strips but is configured to jam only the second deformation strip, and
- wherein the first deformation slide encompasses and jams only the first deformation strip.

5. The steering column of claim 4, wherein the first and second deformation strips are held at a mutual spacing by spacers and in the radial direction are fixed between the casing tube and the rack plate.

6. The steering column of claim 5, wherein the spacers are disposed on the second deformation strip.

7. The steering column of claim 5, wherein the spacers are disposed both on the upper side of the second deformation strip that faces the first deformation strip as well as on the lower side of the second deformation strip that faces the casing tube.

8. The steering column of claim 5, wherein the spacers are studs or a web and are molded in the second deformation strip.

* * * * *